United States Patent
Ramakesavan

(10) Patent No.: US 6,704,770 B1
(45) Date of Patent: Mar. 9, 2004

(54) METHOD AND APPARATUS FOR CUT, COPY, AND PASTE BETWEEN COMPUTER SYSTEMS ACROSS A WIRELESS NETWORK

(75) Inventor: Sundaram Ramakesavan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,964

(22) Filed: Mar. 28, 2000

(51) Int. Cl.$^7$ ............................................... G06F 15/16
(52) U.S. Cl. ....................... 709/205; 709/213; 709/217; 709/227
(58) Field of Search ................................. 709/205, 213, 709/217, 227

(56) References Cited

U.S. PATENT DOCUMENTS

| | | | | |
|---|---|---|---|---|
| 5,748,878 A | * | 5/1998 | Rees et al. ..................... | 714/38 |
| 5,781,192 A | * | 7/1998 | Kodimer ...................... | 345/770 |
| 5,911,066 A | * | 6/1999 | Williams et al. ............. | 709/310 |
| 5,926,633 A | * | 7/1999 | Takagi et al. ................ | 345/619 |
| 5,964,834 A | | 10/1999 | Crutcher ..................... | 709/213 |
| 6,094,684 A | * | 7/2000 | Pallmann .................... | 709/227 |
| 6,177,939 B1 | * | 1/2001 | Blish et al. .................. | 345/770 |
| 6,338,084 B1 | * | 1/2002 | Rankin et al. ............... | 709/214 |

FOREIGN PATENT DOCUMENTS

| EP | 0 597 575 A1 | 5/1994 | ............ G06F/9/46 |
|---|---|---|---|
| EP | 0 651 330 A2 | 5/1995 | ............ G06F/9/46 |
| EP | 0 886 413 A2 | 12/1998 | ......... H04M/1/100 |

OTHER PUBLICATIONS

"Speichern und Kommunizieren", Personal Computer, No. 2, Feb. 1, 1989, p. 90.
"Cascade Clipboards: Accessing Multiple Clipboards", IBM Technical Disclosure Bulletin, vol. 37, No. 03, Mar. 1994.

* cited by examiner

Primary Examiner—Zarni Maung
Assistant Examiner—Jinsong Hu
(74) Attorney, Agent, or Firm—Blakely, Sokoloff, Taylor & Zafman LLP

(57) ABSTRACT

A user graphically selects a portion of text of a first document stored on a first computer system, and chooses "Copy Export" from the edit menu. The user is then presented with a list of computer systems coupled to a wireless network and, from that list, selects a second computer system to which the selected portion of text on the first computer system is to be exported. The selected portion of text is then made available to the wireless network by sending a wireless signal from the first computer system to the second computer system indicating that the data is ready for transmission. The user identifies a location in a second document stored on the second computer system by properly positioning the cursor of the second computer system in the second document, and chooses "Past Import" on the second computer system. A wireless signal is then sent from the second computer system to the first computer system requesting that the data be transmitted. In response, the first computer system wirelessly sends the data to the second computer system. The received text portion is then inserted into the second document at the identified location.

23 Claims, 3 Drawing Sheets

METHOD AND APPARATUS FOR CUT, COPY, AND PASTE BETWEEN COMPUTER SYSTEMS ACROSS A WIRELESS NETWORK

The present invention relates to computer systems and more particularly to wireless communication between computer systems to enable cut, copy, and paste functionality.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions.

Currently, communication protocols are being developed to enable different types of computer systems to communicate with each other, allowing for a rapid exchange of data. Enabling this type of communication among computer systems may greatly enhance our efficiency. Unfortunately, establishing a communication link and exchanging data between computer systems may be a complex, time consuming, and unintuitive task. Because of this, when it comes to downloading some types of information, particularly short text data such as names, addresses, and phone numbers, from one computer system to another, many people resort to transferring this type of information by hand. This can reduce work efficiency.

The present invention addresses this and other problems associated with the prior art.

DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a user may graphically select a portion of text of a first document stored on a first computer system. This portion of text is information, such as a phone number, that the user desires to transfer to another computer system. After selection is made, the user chooses "Copy Export" from the edit menu. The user is then presented with a list of computer systems coupled to the wireless network to which the first computer system is coupled. From this list, the user selects a second computer system to which the selected portion of text on the first computer system is to be exported (i.e. transferred). The selected portion of text is then made available to the wireless network by sending a wireless signal from the first computer system to the second computer system indicating that the data is ready for transmission.

The user (or a different user) may then identify a location in a second document stored on the second computer system by properly positioning the cursor of the second computer system in the second document. The user then chooses "Past Import" on the second computer system. As a result, a wireless signal is then sent from the second computer system to the first computer system requesting that the data be transmitted. In response, the first computer system wirelessly sends the data to the second computer system. The received text portion is then inserted into the second document at the identified location A more detailed description of embodiments of the present invention, including various configurations and implementations, is provided below.

Figure 1:
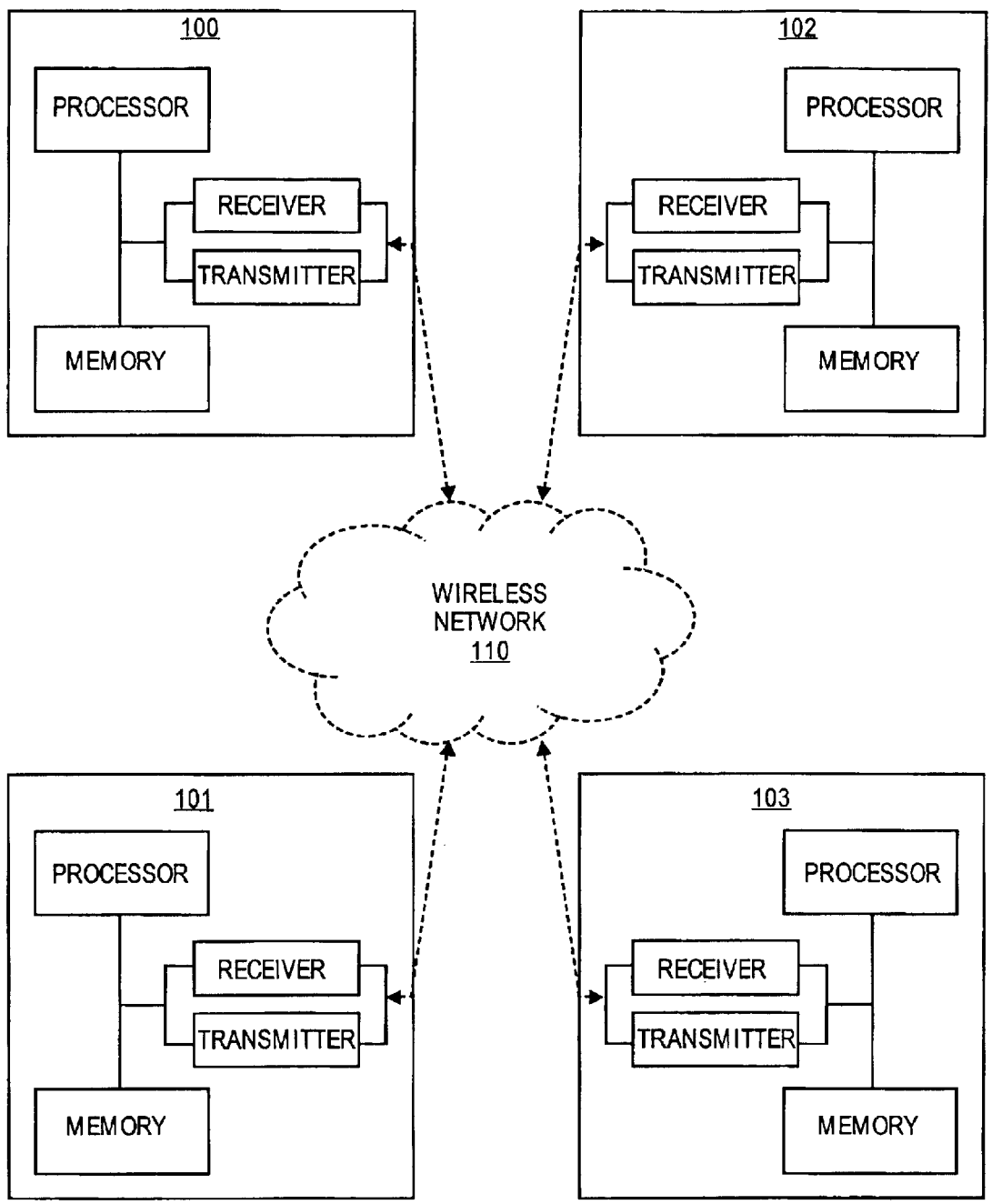
FIG. 1 is a wireless network coupling various computer systems in accordance with an embodiment of the present invention.

FIG. 1 is a wireless network coupling various computer systems, 100–103, in accordance with an embodiment of the present invention. Each computer system includes a processor coupled to memory, a wireless communication receiver, and a wireless communication transmitter. In accordance with an embodiment of the present invention, the processor may be a general purpose processor or any other type of data processor such as a micro-controller. The memory of a computer system may include one or more volatile and/or non-volatile storage devices. In accordance with one embodiment of the present invention, software is stored in the memory region that, when executed by the computer system, causes the computer system to implement a method of the present invention.

The computer systems, 100–103 of FIG. 1, may be any type of computer system such as a mobile computer system (e.g. a notebook or laptop computer system), a handheld device (e.g. a personal data assistant, or "PDA"), a desktop system, a cellular phone, or any other type of electronic device. Note that the computer systems need not be all of the same type of system. For example, computer system 100 may be a mobile system while computer system 101 is a PDA, system 102 is a server or workstation, and system 103 is a cellular phone.

Each of computer systems 100–103 of FIG. 1 is coupled to one another via wireless network 110. Wireless network 110 may be any type of wireless communication protocol. Although wireless network 110 is shown in FIG. 1 supporting four computer systems, a wireless network in accordance with an alternate embodiment of the present invention may support any number of computer systems.

For one embodiment of the present invention, the wireless protocol implemented by wireless network 110 is a protocol in which each of computer systems 100–103 coupled to the wireless network automatically make each other system coupled to the network aware of its presence. For example, for one embodiment of the present invention, the wireless communication protocol implemented by wireless network 110 may be the Bluetooth* protocol described in the Bluetooth Specification, Version 1.0A, released Jul. 24, 1999. For another embodiment, the wireless communication protocol may be the HomeRF* protocol described in the Shared Wireless Access Protocol (SWAP) Specification 1.0, released Jan. 5, 1999. Other communication protocols may be used, however. (*Trademarks and brands are the property of their respective owners.)

Figure 2:
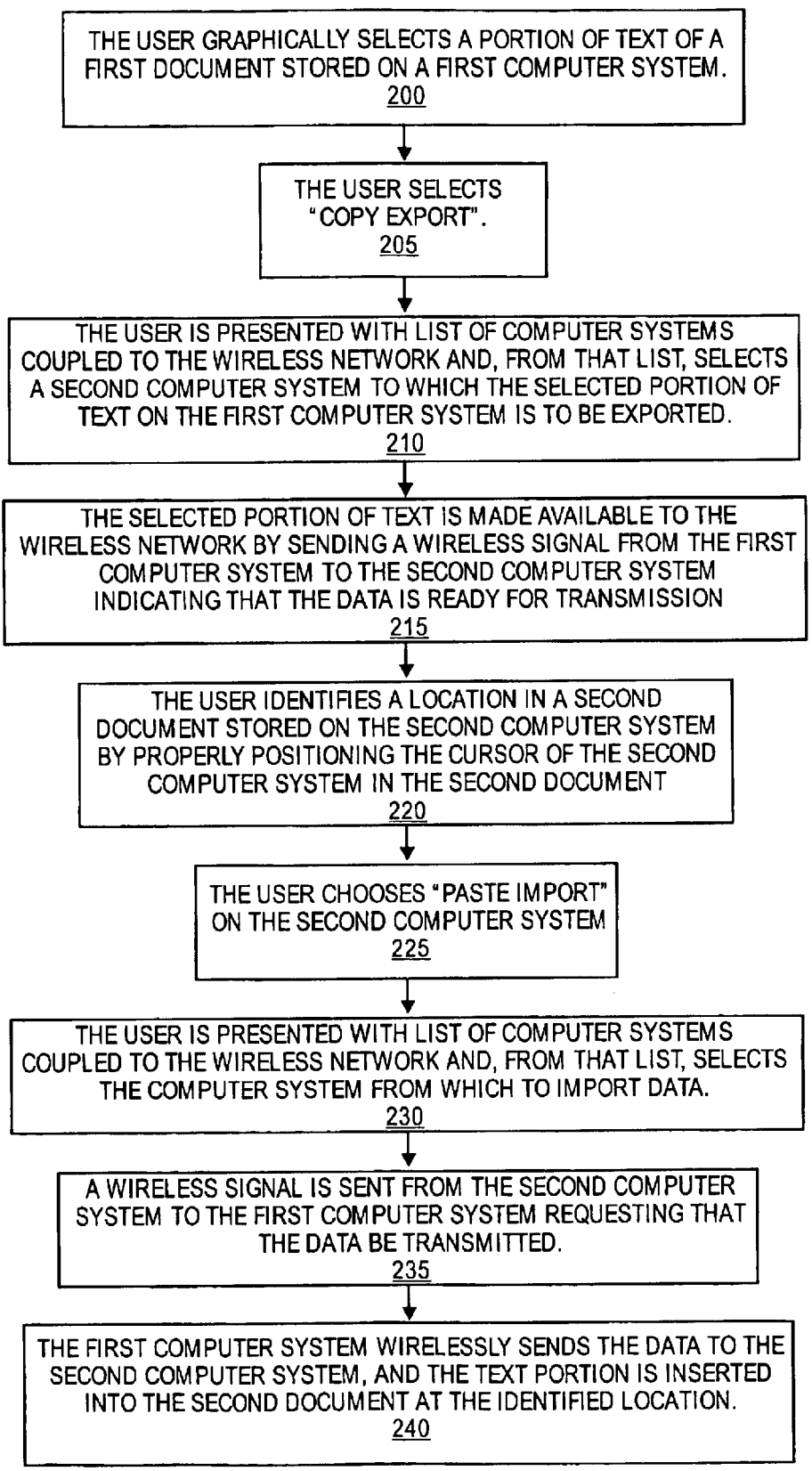
FIG. 2 is a flow chart showing a method of the present invention.

FIG. 2 is a flow chart showing a method of the present invention. At step 200, a user of one of the computer systems of FIG. 1 selects a portion of text of a first document on a first computer system. The selected portion of text is the text that the user wishes to transfer to another computer system. The document may be, for example, a word processor document that is viewable on the computer screen in a running word processor application on the first computer. The text portion may be selected by highlighting the desired portion using a mouse or other pointing device. For an alternate embodiment of the present invention, any portion of a document, including, for example, graphics or sound data, may be selected by the user for transfer to another computer system.

Figure 3:
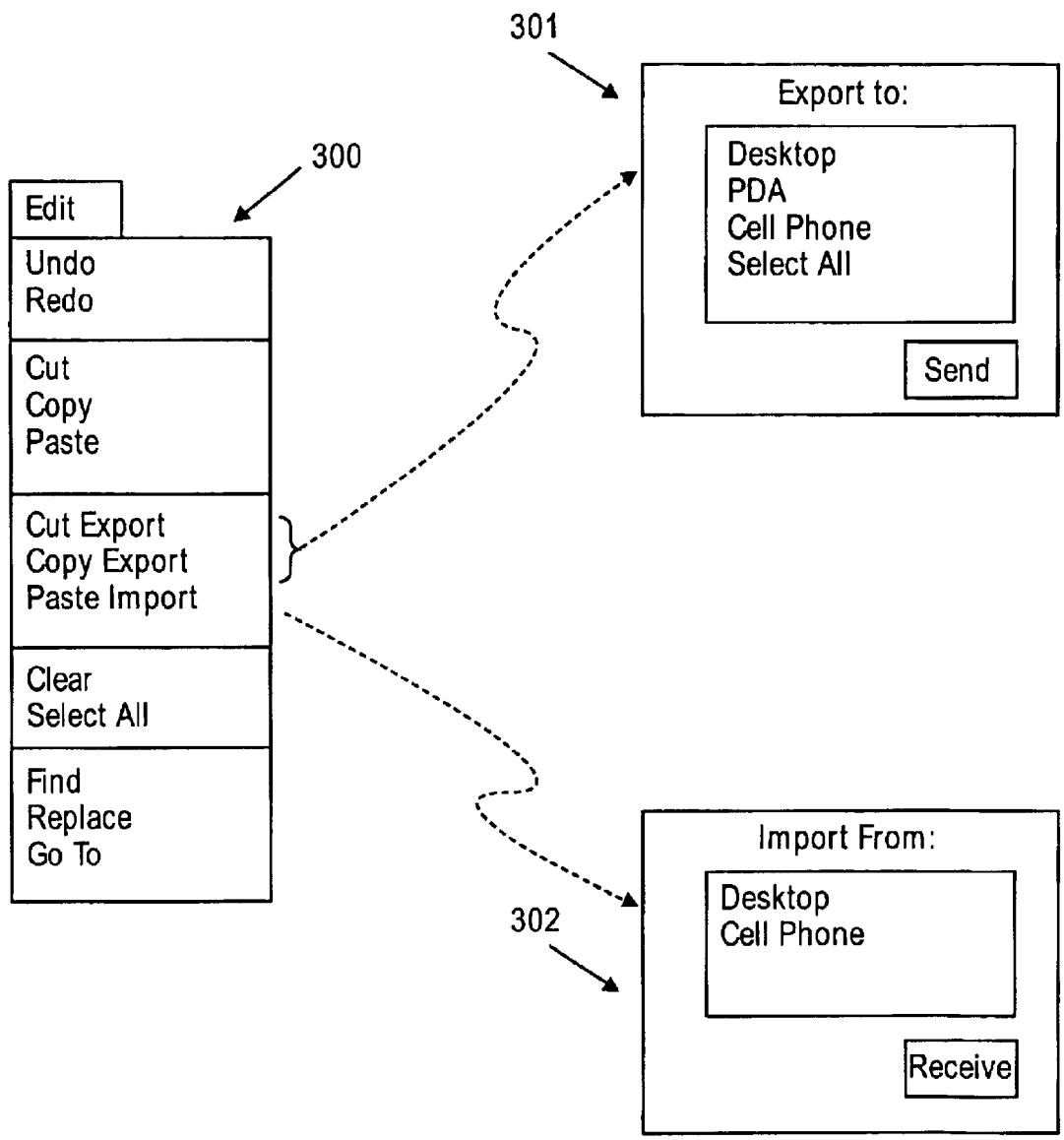
FIG. 3 shows some menu options presented to a user in accordance with an embodiment of the present invention.

After the portion of the file is selected at step 200 of FIG. 2, the user selects "Copy Export" from the "Edit" menu in the application used to view the first document. Menu 300 of FIG. 3 shows an Edit menu in accordance with an embodiment of the present invention. It should be noted that the specific terms used in conjunction with the menu options of FIG. 3 are for illustrative purposes only and may be replaced (or entirely deleted) by alternate terms in accordance with alternate embodiments of the present invention.

Edit menu 300 of FIG. 3 shows some typical Edit menu options, including Undo, Redo, Cut, Copy, and Past. Cut and Copy, if selected by the user, make the selected text portion of step 200 of FIG. 2 available (via the "clipboard") to other documents stored on the first computer system, and unavailable to the wireless network to which the first computer is coupled. The Paste function can then be used to paste the selected text into the other documents stored on the first computer system.

In contrast, Cut Export and Copy Export, if selected by the user, make the selected text portion available for transfer to one or more other computer systems coupled to the wireless network. In other words, Cut, Copy, and Paste may be thought of as "local" Cut, Copy, and Paste functions, while Cut Export, Copy Export, and Paste Import are "global" (or "wireless network-wide") functions. Note that the terms "Cut Export" and "Copy Export", for purposes of this discussion, are interchangeable. For convenience, only "Copy Export" will be discussed herein, but it should be understood that "Cut Export" provides similar functionality, the only difference being that a "Cut Export" clears a selected region while "Copy Export" does not.

In accordance with an alternate embodiment of the present invention, the Cut Export, Copy Export, and Paste Import menu options may alternatively (or exclusively) be selected by one or more keystrokes by a user, by pressing one or more buttons on the computer system, by voice command, by icon-based draging and dropping of the selected text portion, or by any of a number of other methods.

At step 210 of FIG. 2, the user is then presented with a list of computer systems coupled to the wireless network. Such a list is shown in "Export to" dialog box 301 of FIG. 3. The user then specifies, by selecting from the dialog box list, a second computer system to which the selected portion of text on the first computer system is to be exported. In accordance with one embodiment of the present invention, all responding systems coupled to the wireless network automatically appear in the list. For one embodiment, identification of other computer systems coupled to the wireless network are more accurately identified by, for example, the system's registered owner's name.

For an alternate embodiment of the present invention, a user is not presented with dialog box 301 upon choosing Copy Export. Instead, Copy Export may simply make the selected text available to all computer systems coupled to the network. Although this "user-unspecified" embodiment may be easier to implement from a software perspective, it may pose security risks in that the selected text may then be made available for import by a passerby that walks into the wireless network region carrying a computer system that can access available data across the wireless network.

At step 215 of FIG. 2, after the user clicks on "Send" in the "Export to" dialog box, the selected portion of text is made available to the wireless network by sending a wireless signal from the transmitter of the first computer system to the receive of the second computer system. This signal indicates to the second computer system that data (the selected text portion in this example) is available for transmission.

At step 220 of FIG. 2, the user (or a second user operating the second computer system), identifies a location in a second document stored on the second computer system by properly positioning the cursor to the desired location. This is the location where the user desires to paste the textual data copied from the first document on the first computer. For example, suppose the first computer is a mobile computer and the second computer is a cellular phone. Suppose an email is received by the mobile computer, and the email contains an important phone number. The user can select that phone number from their email document, Copy Export it to the cellular phone, then open an address book on the cellular phone and position the cursor at the appropriate entry point where the user wants the phone number pasted.

To paste the text portion into the second document on the second computer system, the user chooses the "Paste Import" option on the second computer at step 225 of FIG. 2. In accordance with one embodiment of the present invention, a dialog box similar to dialog box 302 of FIG. 3 appears at step 230. In this box, the user is presented with list of computer systems coupled to the wireless network and, from that list, selects the computer system from which to import data. For one embodiment of the present invention, all responding computer systems coupled to the wireless network appear in the list. For an alternate embodiment, only those computer systems that have data ready for transmission (i.e. those computer systems on which a user has selected Cut Export or Copy Export) appear in the list. For this embodiment, if only one computer coupled to the wireless network indicates that it has data ready for transmission, then the "Import From" dialog box may not appear because there is no choice to be made.

Next, at step 235 of FIG. 2, after the user clicks on "Receive" in the "Import From" dialog box, a wireless signal is sent from the second computer system to the first computer system requesting that the data be sent. In response to this request, at step 240, the first computer system wirelessly sends the text portion to the second computer system. Upon receiving the text portion, it is inserted into the second document (which may be an address book in a cellular phone, according to the example provided above) at the location identified by the cursor position in the second computer system.

An embodiment of the present invention has been described in which the first computer system has sent data to the second computer system using the Cut/Copy Export function on the first computer system and the Paste Import function on the second computer system. In accordance with another embodiment of the present invention, data can also be sent, in a similar manner, from the second computer system to the first computer system using the Cut/Copy Export function on the second computer system and the Paste Import function on the first computer system.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of transferring data comprising:

allowing a user to select a portion of text in a first document stored on a first computer system;

providing the user with a first option to make the portion available to a wireless network; and wirelessly sending the portion to a separate second computer system-via the wireless network if the user chooses the first option and the second computer system sends a wireless signal to the first computer system, the signal requesting that the portion be sent, the sending being exclusive of any memory shared between the first and second computer systems.

2. The method of claim 1, further comprising providing the user with a second option to make the portion available to a second document stored on the first computer system and unavailable to the wireless network.

3. The method of claim 1 wherein allowing a user to select the portion includes:

running an application program on the first computer system to open and view the first document; and translating user movement of a pointing device to select the portion of text in the first document.

4. The method of claim 1, wherein providing the user with the first option includes allowing the user to make the portion available to a second computer system selected by the user from a list of one or more computer systems coupled to the wireless network.

5. The method of claim 1, wherein providing the user with the first option includes allowing the user to make the portion available to a second computer system selected by the user from a list of one or more computer systems coupled to the wireless network.

6. The method of claim 1, wherein providing the user with the first option includes allowing the user to make the portion available to a second computer system selected by the user from a list of one or more computer systems coupled to the wireless network.

7. The method of claim 1, wherein providing the user with the first option includes allowing the user to make the portion available to a user-unspecified number and identity of computer systems coupled to wireless network.

8. A computer system programmed to implement the method of claim 1.

9. A method of transferring data comprising:

allowing a user to identify a location in a first document stored on a first computer system;

providing the user with a first option to paste data from a wireless network into the first document at the location; and wirelessly receiving the data from a second computer system via the wireless network if the user chooses the first option and the second computer system sends a wireless signal to the first computer system, the signal indicating that the data is available to be sent, the sending being exclusive of any memory shared between the first and second computer systems.

10. The method of claim 9, further comprising providing the user with a second option to paste data from a second document stored on the first computer system into the first document at the location.

11. The method of claim 9, wherein providing the user with the first option includes allowing the user to paste the data from a second computer system selected by the user from a list of one or more computer systems coupled to the wireless network.

12. The method of claim 9, wherein providing the user with the first option includes allowing the user to paste the data from a user-unspecified second computer system coupled to the wireless network if the second computer system is the only computer system coupled to the wireless network that sends a wireless signal to the first computer system indicating that data is ready for transmission.

13. A computer system programmed to implement the method of claim 9.

14. The method of claim 9 further comprising:

allowing the user to select a portion of data in the first document stored on the first computer system; and providing the user with a third option to make the portion available to the wireless network.

15. The method of claim 14, further comprising providing the user with a fourth option to make the portion available to a second document stored on the first computer system and unavailable to the wireless network.

16. A computer system programmed to implement the method of claim 14.

17. A computer system comprising:

a processor;

a wireless communication receiver coupled to the processor;

a wireless communication transmitter coupled to the processor; and software stored on the computer system to allow a user to identify a location in an open document stored on the computer system and to provide the user with an option to paste data received via the receiver into the first document at the location, the data to be received wirelessly from a second computer system if the second computer system sends a wireless signal indicating that the data is available to be sent, the sending being exclusive of any memory shared between the first and second computer systems.

18. The computer system of claim 17 wherein the software further allows the user to select a portion of data in the document and to provide the user with an option to send the portion via the transmitter.

19. A computer-readable medium having stored thereon a set of instructions which, when executed by a first computer system, cause the first computer system to:

allow a user to graphically select, using a pointing device, a portion of text in a first document stored on the first computer system;

providing the user with a first option to make the portion available to a wireless network; and wirelessly sending the portion to a separate second computer system-via the wireless network if the user chooses the first option and the second computer system sends a wireless signal to the first computer system, the signal requesting that the portion be sent, the sending being exclusive of any memory shared between the first and second computer systems.

20. The medium of claim 19 wherein the set of instructions further cause the first computer system to provide the user with a second option to make the portion available to a second document stored on the first computer system and unavailable to the wireless network.

21. The medium of claim 20 wherein the set of instructions further cause the first computer system to allow the user to make the portion available to a second computer system selected by the user from a list of one or more computer systems coupled to the wireless network.

22. The medium of claim 19 wherein the set of instructions further cause the first computer system to allow the user to identify a location in the first document and to provide the user with an option to paste data from the wireless network into the first document at the location.

23. The medium of claim 22 wherein the set of instructions further cause the first computer system to allow the user to paste the data from a second computer system selected by the user from a list of one or more computer systems coupled to the wireless network.

* * * * *